United States Patent [19]

Dadpey et al.

[11] Patent Number: 4,697,130
[45] Date of Patent: Sep. 29, 1987

[54] INDUCTION MOTOR REGENERATIVE BRAKE CONTROL APPARATUS AND METHOD

[75] Inventors: Habib Dadpey, Atlanta, Ga.; Paul J. Merlino, West Newton, Pa.; David J. Shero, South Park Township, Allegheny County, Pa.

[73] Assignee: Westinghouse Electric Corp., Pittsburgh, Pa.

[21] Appl. No.: 946,159

[22] Filed: Dec. 22, 1986

Related U.S. Application Data

[63] Continuation of Ser. No. 696,938, Jan. 31, 1985, abandoned.

[51] Int. Cl.⁴ .............................................. H02P 3/18
[52] U.S. Cl. .................................... 318/760; 318/762
[58] Field of Search ................................. 318/757–762

[56] References Cited

U.S. PATENT DOCUMENTS

| | | | |
|---|---|---|---|
| 3,675,099 | 7/1972 | Johnston | 318/762 |
| 3,983,463 | 9/1976 | Nabae et al. | 318/803 |
| 4,090,115 | 5/1978 | Franz, Jr. | 318/345 E |
| 4,093,900 | 6/1978 | Plunkett | 318/376 |

*Primary Examiner*—David Smith, Jr.
*Attorney, Agent, or Firm*—J. L. Brzuszek

[57] ABSTRACT

An AC induction motor brake control apparatus and method are provided for energizing the motor with an inverter supplied first voltage and an additional brake circuit supplied second voltage in phase with and additive to the first voltage as required to determine a desired brake torque above base speed operation.

16 Claims, 14 Drawing Figures

4,697,130

INDUCTION MOTOR REGENERATIVE BRAKE CONTROL APPARATUS AND METHOD

This application is a continuation of application Ser. No. 06/696,938 filed Jan. 31, 1985 now abandoned.

CROSS REFERENCE TO RELATED APPLICATIONS

The present application is related to the following concurrently filed patent applications Ser. No. 696,814, by D. J. Shero et al. and entitled "Induction Motor Synthesis Control Apparatus And Method", Ser. No. 696,832, by H. Dadpey et al. and entitled "Torque Determination For Control of An Induction Motor Apparatus", and Ser. No. 696,833, by D. J. Shero et al. and entitled "Induction Motor Control Apparatus And Method", which are assigned to the same assignee and the disclosures of which are incorporated herein by reference.

BACKGROUND OF THE INVENTION

1. Field of the Invention

This invention relates in general to the control of an induction motor apparatus driven from a DC power source through an inverter.

2. Description of the Prior Art

It is known to provide a closed loop control of an AC motor drive apparatus, including a three phase AC motor which is powered using a GTO based voltage fed inverter that is powered directly from a DC power source. The GTO switches in the inverter are to have a predetermined connection time between each phase of the motor and either one of the two power rails, i.e. high and low voltage. The relationship of each phase with respect to the other phases generates the needed AC waveforms in order to properly excite the motor.

For a transit vehicle, it is known that the torque output from the one or more propulsion motors is to be maintained at a particular level to accelerate or decelerate the vehicle at a predetermined rate. Due to various disturbances and unknown variables, it is known to provide a closed loop control apparatus that determines the torque output of the motor and controls the AC waveforms to that motor so as to maintain the desired torque output from that motor.

The torque output from an AC motor can be controlled by varying the slip frequency and/or the motor voltage. In a motor drive system where the input voltage source is DC, a variable voltage and variable frequency voltage source inverter can be used to vary these motor parameters.

It is known in the prior art to provide an induction motor control system including a regenerative braking mode operative with an inverter supplying the motor voltage for determining the provided brake torque, as shown by U.S. Pat. No. 3,815,002 of Clemente et al., including a different transformer winding connected in series with each phase of a three phase AC motor and having a shunt thyristor provided to short out each transformer winding during motoring operation. The braking torque is controlled by phase angle modulation of the thyristors.

SUMMARY OF THE INVENTION

A variable voltage and variable frequency inverter drive motor control apparatus and method are provided for an AC induction motor drive system using a programmed microprocessor to determine the required switching of the motor currents on and off. An additional motor voltage source is connected with the inverter apparatus to supplement the motor voltage supplied by the inverter apparatus as required to provide the total motor voltage to develop the desired brake torque for the induction motor drive system to provide a desired regenerative brake motor operation.

DESCRIPTION OF THE PREFERRED EMBODIMENT

Figure 1:
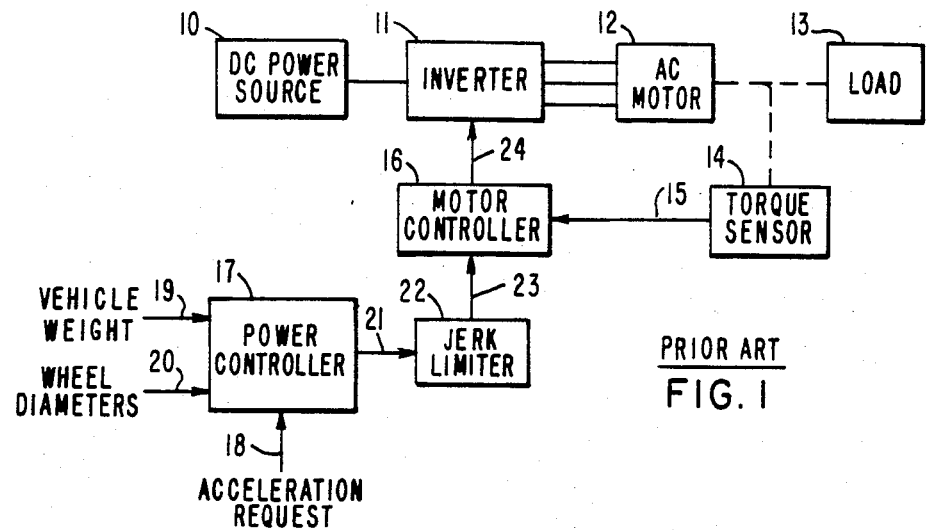
FIG. 1 shows a prior art AC induction motor control apparatus.

In FIG. 1 there is shown a prior art AC induction motor control apparatus including a DC power source 10 coupled with an inverter 11 for determining the operation of a three-phase AC induction motor 12 connected with a load 13 which represents a transit vehicle. A torque sensor 14 is coupled with the motor 12 to provide a torque feedback 15 to a motor controller 16. A power controller 17 receives as inputs an acceleration request 18 from the transit vehicle operator, the transit vehicle weight 19, and the transit vehicle wheel diameters 20. The power controller 17 produces a torque effort request 21, which represents the torque to be achieved by the AC motor 12 in order to accelerate the transit vehicle, as represented by load 13, at the rate defined by acceleration request 18. A jerk limiter 22 takes the torque effort request 21 and jerk limits it to provide a jerk limited torque effort request 23 to the motor controller 16. The motor controller 16 produces GTO switch firing pulses 24 for the inverter 11, in order to match the torque feedback 15 to the jerk limited torque effort request 23.

Figure 2:
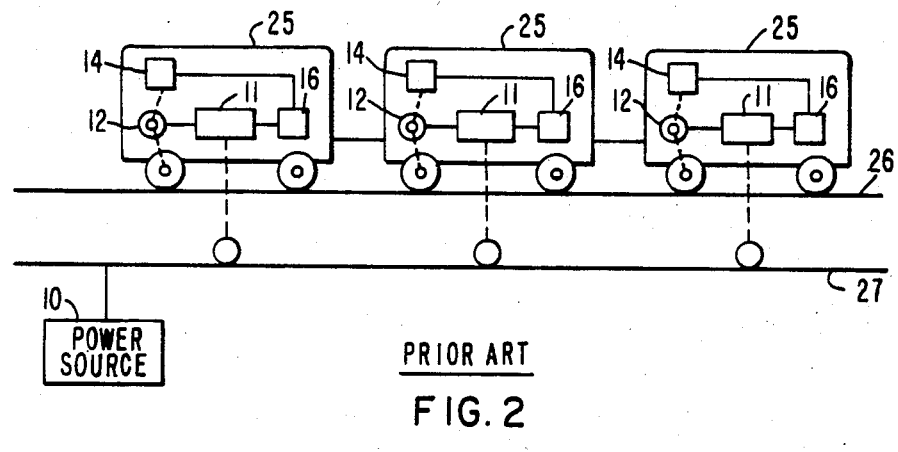
FIG. 2 shows a typical prior art transit vehicle operative with a roadway track and an AC propulsion motor apparatus.

In FIG. 2 there is shown a transit vehicle 25, which could be the load 13, operative with a roadway track 26 and including the inverter 11, the induction motor 12, the motor controller 16 and the torque sensor 14 coupled with the motor 12. The power source 10 energizes the inverter 11 through a power line 27.

Figure 3:
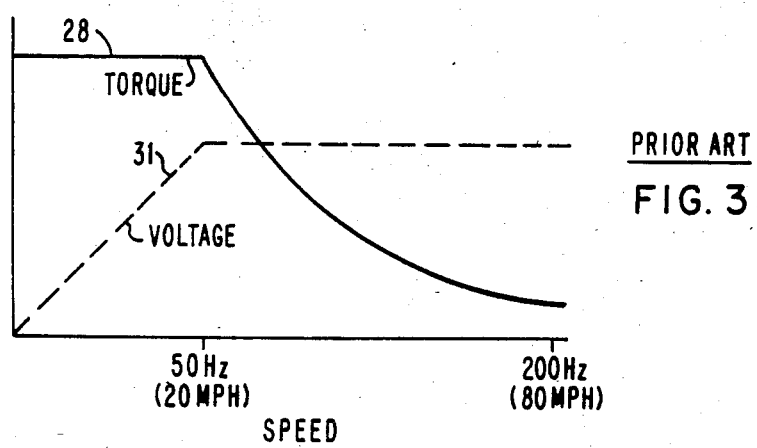
FIG. 3 shows the well known torque and voltage versus speed relationship curves for a transit vehicle AC induction propulsion motor.

In FIG. 3 there are shown the well-known torque and voltage versus speed curves for an induction motor. The power torque of the motor as shown by curve 28 is constant from zero speed up to the base speed and then falls off for speeds above base speed which is shown to be 50 Hz and approximately 20 mph of vehicle operation. The motor voltage increases linearly as shown by curve 31 up to base speed and then stays constant for motor speeds above that base speed of the motor.

Up to the 50 Hz base speed operation for the motor, which is equivalent to the vehicle going about 20 mph along the roadway track, the inverter 11 will give full torque in power operation as shown by curve 28. During this time the motor voltage across the motor shown by curve 31 can be increased as needed to provide this operation. Up until this base speed the voltage 31 is increased as required to maintain constant torque up to the maximum rms voltage output of the inverter 11 in relation to a predetermined DC line voltage from the power source 10, and the voltage 31 then flattens out and the torque 28 falls off such that at 200 Hz, which is about 80 mph, about 1/16 of the torque 28 is available as was available at 50 Hz. In the brake operation the inverter 11 will provide the same torque 28 because of the voltage 31 across the motor. The brake motor operation goes back up to the torque curve 28 as the motor speed decreases. The slip can be increased, if desired, to get a little more torque.

A typical transit car motor has four poles, with the rotor frequency being equal to the mechanical frequency in RPM times 30.

Figure 4:
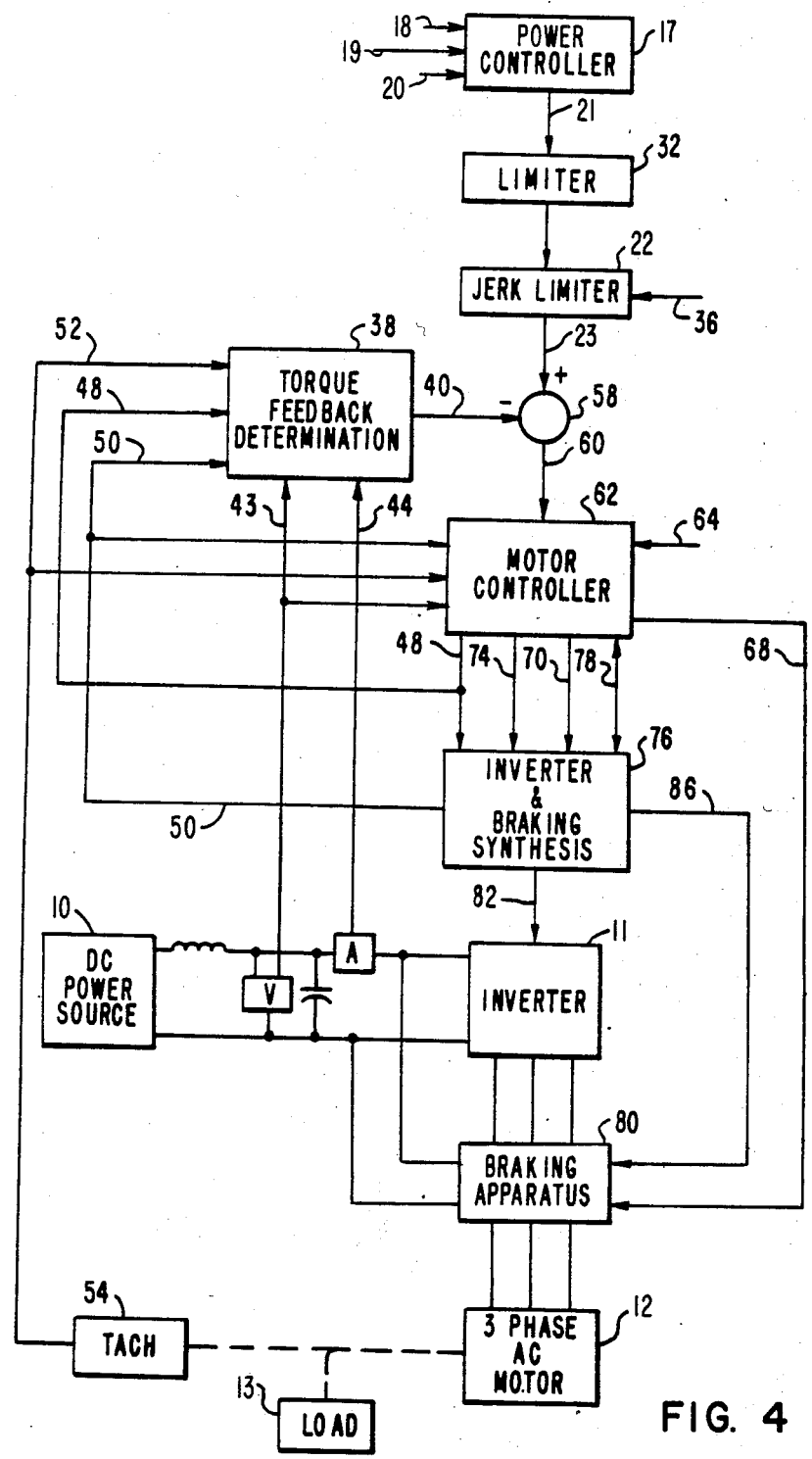
FIG. 4 show a block diagram of the present AC induction motor control apparatus.

In FIG. 4 there is shown a suitable motor control apparatus for operation in accordance with the present invention to control a three phase AC motor, such as the propulsion motor of a mass transit passenger vehicle. The vehicle operator can provide a power controller 17 with a vehicle acceleration request 18 which, the power controller 17 or car control translates into a torque effort request signal 21 which is input to a signal limiter 22 for preventing unreasonable torque effort requests. A jerk limiter 22 is provided in relation to a desired jerk rate 36 for establishing a jerk limited torque request 23 for the comfort of the vehicle passengers. A torque feedback determination apparatus 38 determines the torque feedback 40 by measuring the system input power in relation to the DC voltage 43 and DC current 44 provided by a power supply 10 and in relation to the inverter frequency 48 and the synthesis mode 50 and the tachometer speed 52 provided by a tachometer 54 coupled with the propulsion motor 12 to estimate the output torque of the motor 12. The torque feedback signal 40 is supplied to the negative input of a summing junction 58 for comparison with the jerk limited torque request signal 23 supplied to the positive input of the summing junction 58. The resulting torque error signal 60 is supplied to a motor controller 62. A control enable signal 64 from the operator permits the propulsion motor 12 to run or not. Other needed inputs by the motor controller 62 consist of the DC line voltage 43, the tach frequency 52, and the synthesis mode of the inverter 50. The motor controller 62 outputs the braking thyristors enable 68, the desired braking angle 70, the requested inverter frequency 48, and the requested inverter voltage percent 74 to the inverter and braking synthesis apparatus 76, which in addition has as an input and output control state signal 78 and provides the synthesis mode signal 50 to the motor controller 62 and to the torque feedback determination apparatus 38. When the motor 12 is in brake operation, with additional voltage supplied by the transformer braking circuit 80, the control state signal 78 operates to keep the synthesis mode in six-step and prevents a change to the quasi six-step or PWM modes. The inverter and braking synthesis apparatus 76 outputs the inverter GTO firing pulses 82 to the inverter 11 and the brake GTO firing pulses 86 to the braking circuit 80. The inverter 11 drives the motor 12 in power and in brake operation and the braking circuit 80 operates with the motor 12 when additional braking torque is desired above base speed operation.

Figure 5:
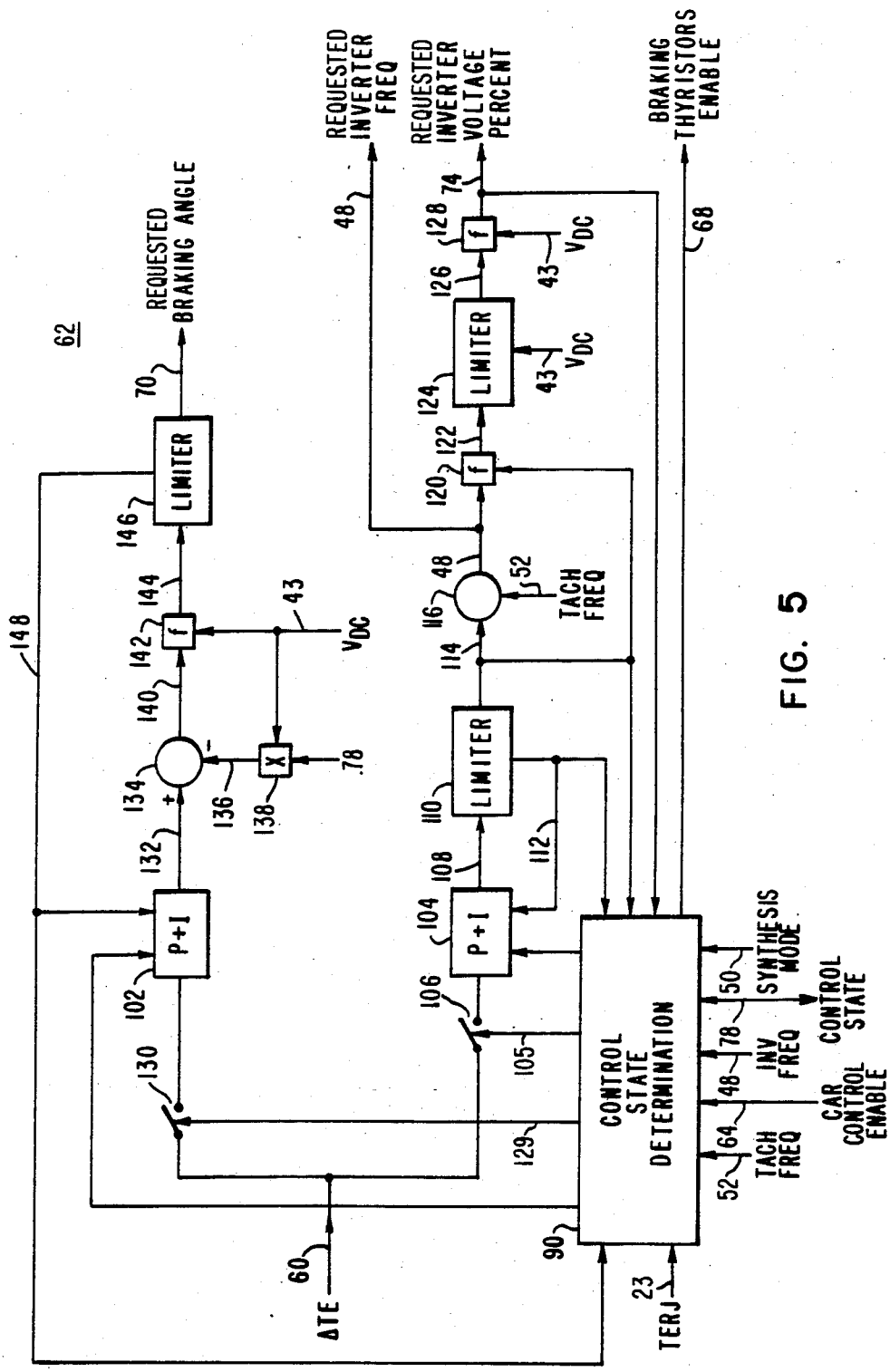
FIG. 5 shows functionally the motor controller of the present AC induction motor control apparatus.

In FIG. 5 there is functionally shown the motor controller 62, including the control state determination apparatus 90, which has an input and output the current control state 78 for determining the next control state. The inputs are the inverter frequency 48, the car control enable 64 to indicate if the inverter is enabled to run the inverter synthesis mode 50, the tach frequency 52, and the jerk limited torque request or TERJ 23 which determines whether in power or brake. If the TERJ 23 is positive, then the control operation is going to be a power state, if the TERJ 23 is negative, the control is going to be in brake. The synthesis mode 50 prevents a change to transformer brake apparatus operation if the control operation is not in six-step. The motor controller 62 includes a brake PI controller 102 and a slip controller 104. The control state determination apparatus 90 provides a slip enable 105 to the switch 106 which routes the torque error signal 60 into the slip controller 104. If the operation excludes the transformer braking apparatus 80, for example, where it is desired to vary the motor slip in order to control the motor torque, the switch 106 will be closed permitting the torque error signal 60 to go into the slip P+I controller 104 and output a desired slip frequency 108 into the limiter 110 which prevents too much slip and avoids going over the knee of the torque versus slip curve. The limiter 110 provides a slip limit feedback 112 back into the slip P+I controller 104 to limit the slip to a desired maximum level and to preset the slip P+I controller 104 to clamp the controller 104 so the integral portion does not continue rising. The output 114 of the limiter 110 is the slip frequency 114 which is also fed back into the control state determination apparatus 90 to control a couple of different state determinations. The slip frequency 114 is added to the tach frequency 52 in an adder 116 and the output is the requested inverter frequency 48. The function generator 120 uses the inverter frequency 48 and the slip frequency 114 to generate a desired inverter voltage 122 that will result in the AC motor 12 being operated at constant rated air gap flux. This desired inverter voltage 122 is not obtainable above base speed from the inverter 11 due to limits imposed by the DC line voltage. Therefore, the voltage limiter 124 monitors the DC line voltage 43 to determine if the desired inverter voltage 122 can be obtained. If the voltage 122 cannot be obtained, the voltage limiter 124 will clamp to a voltage that can be obtained. If the voltage 122 can be obtained, the voltage limiter 124 will not modify the voltage 122. The output of the limiter 124 is the requested inverter voltage 126 and that goes into another function generator 128 which has as another input the DC line voltage 43, and the output is the inverter voltage percent 74. The DC line voltage 43 multiplied by the constant 0.78 represents the maximum obtainable inverter output voltage. The inverter voltage 126 is divided by this maximum obtainable inverter output voltage resulting in a requested inverter voltage percent 74. The requested inverter frequency 48 is an output from the adder 116.

The brake voltage P+I controller 102 has an input switch 130. If the control state determination apparatus 90 wants to activate the brake controller 102, the braking enable 129 closes the switch 130 to enable the error signal 60 to be fed into the brake P+I controller 102 that operates as an integral controller. The output of the brake P+I controller 102 is the desired motor voltage 132, which goes into an adder 134 that has another input called six-step inverter voltage 136. The DC line voltage 43 goes through a multiplier 138 to be multiplied times a constant K of 0.78 and the output of the multiplier 138 is the six-step inverter voltage 136 which is the maximum amount of voltage that the inverter 11 can output in six-step operation. The adder 134 takes the desired motor voltage 132 and subtracts the six-step inverter voltage 136, and the result is the desired transformer output voltage 140, which is then fed into function generator 142 in relation to the DC line voltage 43 to produce the desired braking angle 144. This is the angle that the GTO switches in the brake apparatus 80 must be turned off during every 180° cycle in order to produce the desired transformer output voltage 140. The function generator 142 calculates the desired braking angle 144 using the following relationship $$\text{ANGLE} = \frac{360}{\pi} * \text{ARCSIN}\left(\frac{\pi}{4} * \frac{V_{TX}}{V_{TDC}}\right) \quad (1)$$

where $V_{TX}$ is the desired transformer output voltage 140 and $V_{TDC}$ is the instantaneous voltage appearing across the secondary of the braking transformer such as 550 V for a turns ratio of 0.9 and a power supply voltage of 600 V. This desired braking angle 144 must be between zero and 80° out of that 180° during which the GTO switches in the braking apparatus 80 will be turned off and thus be providing the brake voltage across the motor 12 for that angle. The desired braking angle 144 goes into the limiter 146 to limit the desired braking angle to no less than zero degrees and to no more than 80°. The zero degree limit is provided because a negative amount of time is not available out of the GTO switch and the 80° limit is provided because at that point the GTO switch is getting close to being off when the current has the wrong polarity such that this would induce a negative voltage to subtract from the provided motor voltage. One output of the limiter 146 is the requested braking angle 70 and another output is the angle limit 148, which is fed back to preset the brake P+I controller 102 to clamp the integral portion of the P+I controller 102. The angle limit 148 also feeds back into the control state determination apparatus 90 to determine if a change to a different control state is needed. For example, once the transformer brake operation runs out of voltage, which happens when the braking angle reaches 80°, the control state determination apparatus 90 may want to go to the high slip next control state which results in holding the maximum braking angle and then increasing the slip to get a little bit of additional braking torque. For another example, once the GTO switch operation reaches a zero degree angle, the control state determination apparatus 90 can get out of transformer braking since there is no longer a need for it. The control state determination apparatus 90 outputs a braking thyristor enable 68 to either turn on the thyristors or turn them off. Within a state of transformer braking, the braking thyristor enable 68 keeps the thyristors off, and when not in a state of transformer braking, the thyristors are kept on.

The inverter and braking synthesis apparatus 76 provides a synthesis mode determination 50. The inverter frequency 48, the inverter voltage percent 74 and the present control state 78 are input to the synthesis apparatus 76, and the synthesis mode output 50 will determine the type of synthesis operation that is wanted, such as one of PWM, quasi six-step or six-step.

Figure 6:
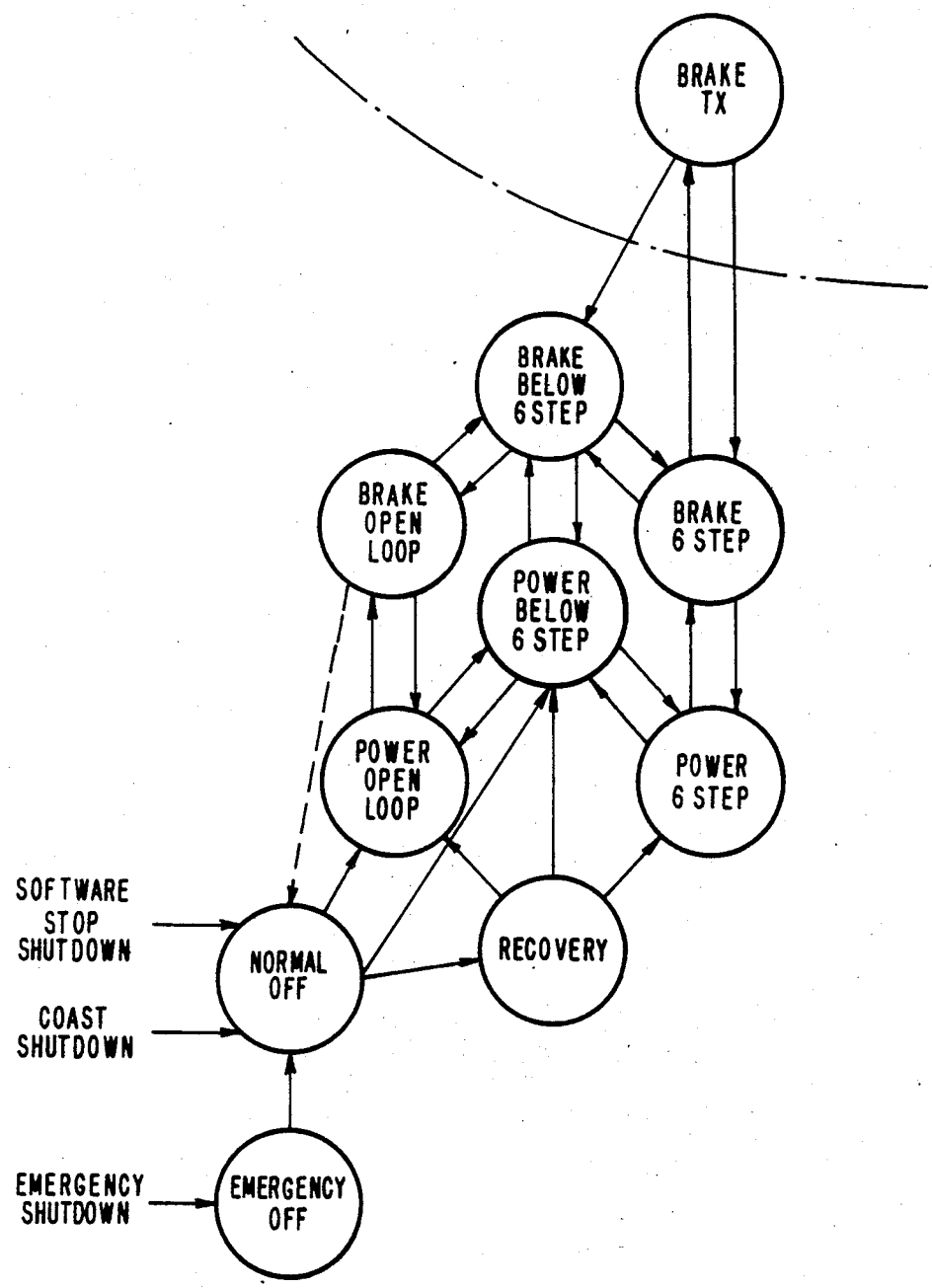
FIG. 6 shows the control states of the present AC motor control apparatus.

In FIG. 6 there is shown the control states of the present AC motor control apparatus. The operation of the present control apparatus can be divided into the three basic states of off, power, or brake.

The off state can be further divided into normal or emergency off states, which both indicate that the system is not operational. A normal off condition results from a command by the vehicle control input, such as from the operator's master controller. An emergency off condition results from a system shutdown as a result of an unacceptable condition such as overcurrent or low line voltage.

The power state is divided into the two regions of below or above base speed. The distinction is made because below base speed the motor is essentially operated under constant volts per hertz condition resulting in maintaining a desired air gap flux density, whereas in the above base speed range the inverter is operated in the six-step mode to give the maximum obtainable output torque from the motor and the air gap flux density is decreased as a result of increased speed.

The brake state comprises the same two basic divisions as the power state of below and above base speed. The below base speed region is also similar to the power case since the inverter is capable of providing the demanded torque by itself. The brake above base speed is more complicated since the inverter cannot generate the required torque alone and the regeneration braking circuit 80 must be used. The brake above base speed region is further divided into three separate sections:

(A) brake above base speed and below rated slip;
(B) brake above base speed at rated slip with regeneration circuit not at max capability;
(C) brake above base speed with regeneration circuit at max capability and slip at more than rated slip.

The transitions between these control states are made through special transition routines which define the possible control states that can be entered based on the present control state and the existing conditions, such that a transition can be made from power above base speed to brake above base speed and below rated slip A, but not to the other two brake above base speed conditions B or C.

The basic control philosophy is one of slip control, that is, the slip of the motor is adjusted by varying the operating frequency of the inverter in order to achieve the desired torque output. During the operation in the below base speed region, the motor is kept in the constant volts per hertz operation, resulting in rated air gap flux density. Whereas above base speed, the inverter is in six-step and is at maximum voltage output. In this mode of operation inverter voltage cannot be manipulated to obtain rated air gap flux density.

If a motor is in a braking state above base speed, and it is desirable to obtain more braking torque than can be achieved by adjusting slip at the maximum voltage output, it is not practical to get the required braking rate without somehow increasing the motor voltage. A special transformer circuit is used to provide the extra voltage needed by the motor. When braking the motor above base speed, the slip of the motor is manipulated to arrive at the desired torque. If by the time slip reaches the rated value and the desired torque is not reached, then the slip is held at that value and the transformer voltage controller is released to increase the voltage on the motor for increasing the torque output in brake until the maximum brake angle is reached at about 80. Then the transformer controller is locked at this position and the slip controller is released allowing the slip to increase above its rated value up to an absolute maximum slip in order to satisfy the torque request. This strategy is provided to keep the currents in the GTOs under a preset limit of 350 amps RMS in order to avoid shutdowns due to overcurrent conditions while providing the torque needed to satisfy the torque request.

The control operation is initialized at the control state of emergency off, such that the start-up or power-up operation is emergency off. From emergency off, the only other next state is normal off, and the operator car controller allows that transition. Once in normal off and the car conroller requests go, a jump can be made to either the recovery routine state) to the power open loop state, or to the power below six-step state. While in the emergency off state, a check is made to see if the recovery timer is timed out, which is a timer provided to keep the control state in emergency off for a predetermined time period. Then a change of the control state to normal off and then to either power below six-step, power open loop, or recovery is made depending upon operating conditions. Once the inverter is running then the determine mode routine is executed to see if it is desired to change to another state. For example, if the control was in power below six-step and a brake request is received a change would be made to brake below six-step, and the operation is going to change from power to brake. Most of the paths indicated in FIG. 6 are determined in the determine mode routine disclosed in the above cross-referenced patent application Ser. No. 696,833, with the exception of the changes between six-steps and below six-step which are in the synthesis transition disclosed in the above cross-referenced patent application Ser. No. 696,814. The other paths are done under the determine mode routine. For example, if the present control state is power below six-step, the determine mode routine will check the conditions to go either to power open loop or to go to brake below six-step and those are the only choices available. The synthesis will check the conditions to go to power six-step.

Figure 7:
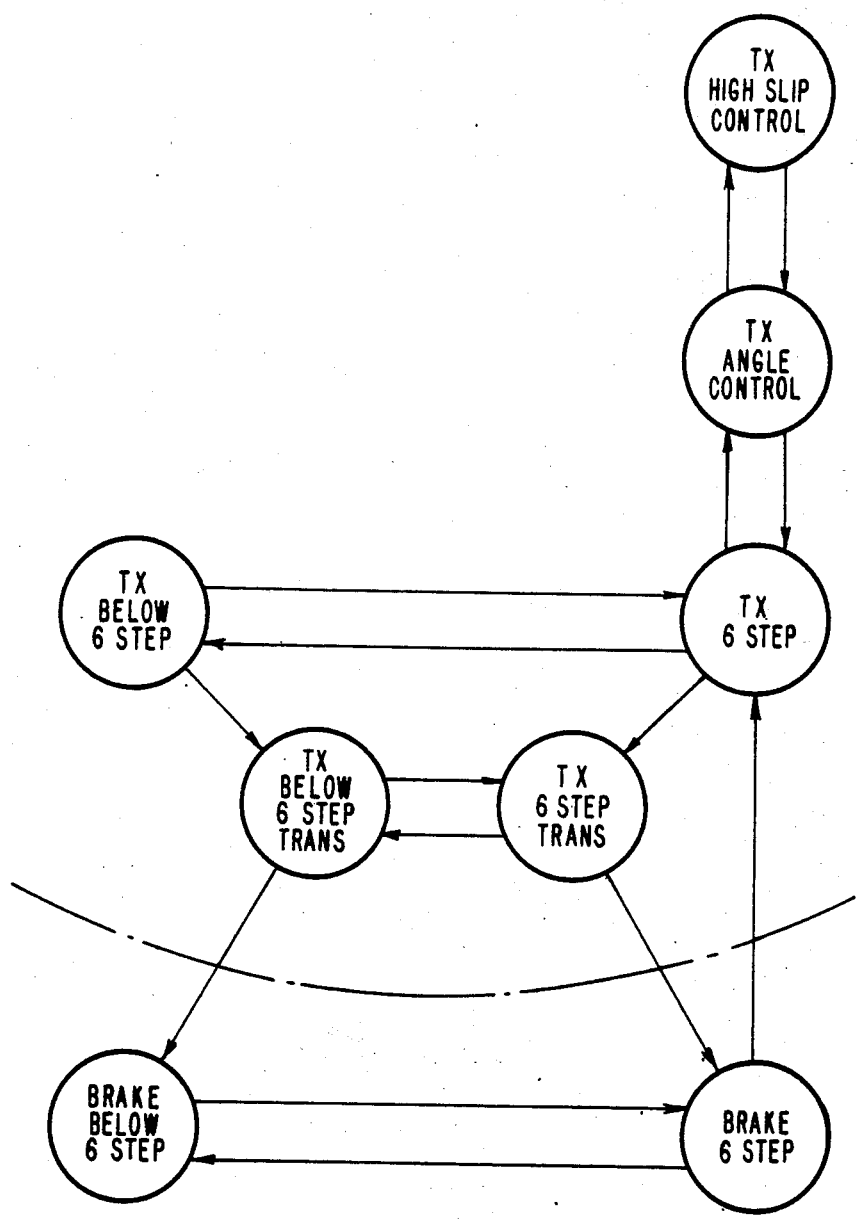
FIG. 7 shows the brake TX control substates of the present AC motor control apparatus.

In FIG. 7 there are shown the brake TX substates, which are control states within brake TX as shown in FIG. 6. In FIG. 6 there are shown the ten different control states, and the brake TX as shown in FIG. 7 includes six substates. Every time the operation cycles through the determine mode routine a check is made to see if there is a desire to go to a different control state or control substate. The determine mode routine checks predetermined criteria to see if there is a desire to change to another control state.

The speed and torque of the AC induction motor 12 are controlled by the requested inverter voltage percent 74 and the requested inverter frequency 48. If the requested frequency 48 leads the actual mechanical frequency of the motor 12 in power, the motor speeds up in a positive torque operation, and if the requested frequency 48 lags the actual mechanical frequency of the motor 12, the motor will operate in a brake mode and will slow down. The motor 12 tries to follow the requested inverter frequency 48 within reason. The forward and reverse operation control of the motor is provided by interchanging the GTO firing pulses to two of the inverter poles.

The inverter 11 can include for each phase pole an upper GTO switch and a lower GTO switch. For the example of the power source 10 being 600 volts, the upper GTO switch for each phase is connected to the 600 volt line side of the power source 10 and the lower GTO switch for each phase is connected to the ground line of the power supply 10. Depending upon which GTO switch is turned on, the associated motor phase line is connected to the high voltage or is connected to ground. By modulating the turn-on and turn-off operation of the respective GTO switches, the desired voltage is output to the motor 12 for each phase of the motor 12. The inverter 11 in this way produces the desired motor voltage 31 shown in FIG. 3 across the AC motor windings.

Figure 8:
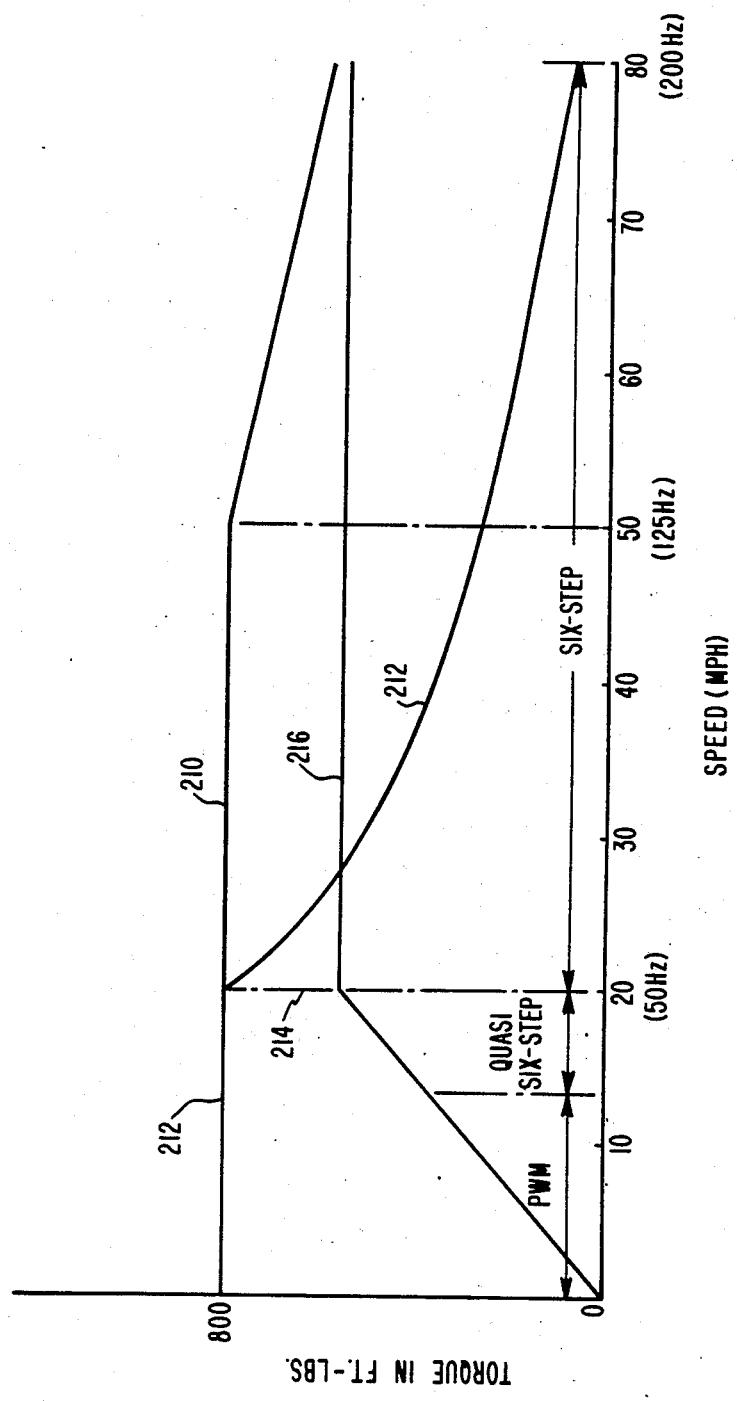
FIG. 8 illustrates the motor torque and motor speed relationship in each of the power mode and the brake mode of operation of the present invention.

In FIG. 8 the brake torque requirements are shown by curve 210 that the vehicle has to meet in order to provide the desired braking rate. The power desired acceleration rate of 3 mph per second is provided by the power torque curve 212 and the power torque curve 212 falls off above base speed 214 since the inverter output voltage 216 does not increase above base speed 214. In the braking operation, the desired deceleration rate of 3 mph per second requires the braking torque shown by curve 210 up to about 50 mph, which is about 125 Hz, and then the brake torque drops off to 2.5 mph per second at 80 mph, which corresponds to about 200 Hz. The brake torque below 125 Hz is about 800 ft-lbs as shown by curve 210, and the power torque below 50 Hz is about 800 ft-lbs. At 80 mph about 50 ft-lbs of torque is provided in power by the motor. The desired brake torque requires about 650 ft-lbs at 80 mph which increases to 800 ft-lbs at about 125 Hz of vehicle operation. A motor voltage percent is requested for the brake operation to provide a desired slip, and the inverter 11 by itself cannot supply the required voltage for this purpose. The motor characteristics are such that the slip can be increased until the torque in power will no longer increase. In brake the negative slip can be increased only so far and the torque will not reach the desired brake torque with only the motor voltage supplied by the inverter 11.

The requested braking angle signal 70 shown in FIG. 4 is an output of the motor controller 62, which signal 70 goes into the inverter and braking synthesis apparatus 76 where the brake angle times are calculated.

In above cross-referenced patent application Ser. No. 696,814, the inverter and brake synthesis apparatus includes a six-step block, and the desired braking angle signal 70 goes into that block. Out of the six-step block is provided the inverter GTO firing pulses 82 and the brake GTO firing pulses 86, which are calculated together.

In the operation of the interrupt routine described in above cross-referenced patent application Ser. No. 696,833, whenever a pulse ends in one of the inverter synthesis timers, it interrupts the microprocessor.

In the six-step synthesis operation, disclosed in the above-referenced patent application Ser. No. 696,814, a new inverter synthesis time is calculated and output to the appropriate synthesis timer during the interrupt routine of the microprocessor. Also during this interrupt routine, the two brake times for one phase of the braking GTO's are calculated from the requested braking angle 70 and are output to the two braking synthesis timers for that phase if the requested braking angle 70 is not equal to zero degrees. If equal to zero degrees, no times are output because transformer braking is not being requested. These two braking times are calculated in the six-step calculation routine and combined together to determine when and how long the brake GTO for that phase in braking apparatus 80 will be off. The brake timer circuitry uses these two times to generate one of the brake GTO firing pulses 86 to the braking apparatus 80. Two timers exist to control each of the brake GTOs in the other two motor phases in a similar manner.

Figure 9:
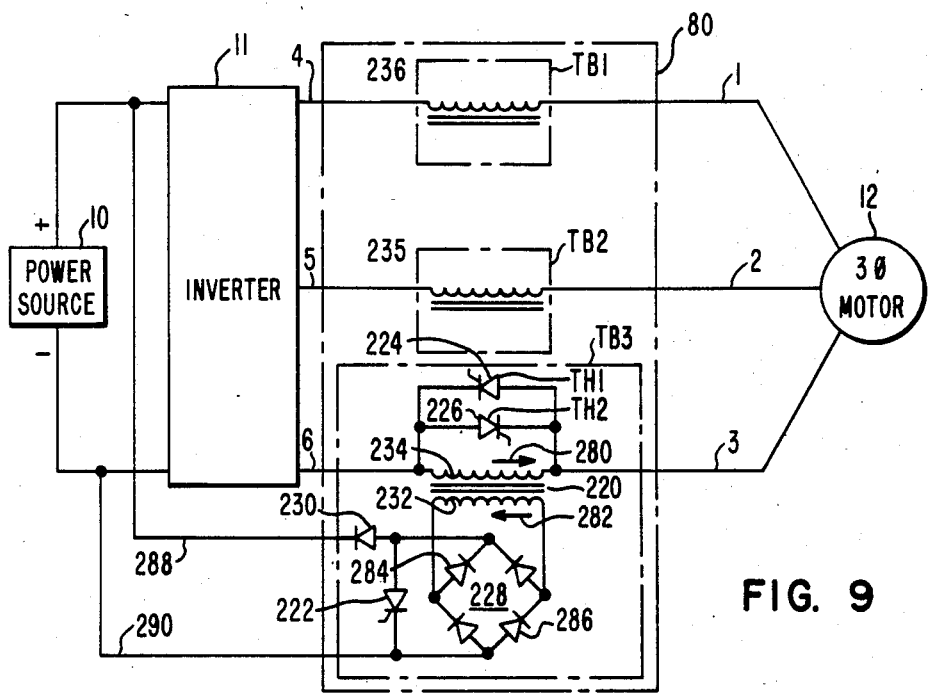
FIG. 9 shows schematically the brake apparatus for providing the desired motor voltage for the brake mode of operation of the induction motor drive system of the present invention.

In FIG. 9 there is shown schematically one phase of the brake apparatus 80. The motor torque can be approximated by the relationship $$T = K \times VM^2 \times S \times 1/F^2, \quad (2)$$

where:
VM is the motor voltage in volts rms,
S is the slip difference between the stator and rotor frequencies in Hz,
F is the inverter frequency in Hz as applied to the stator, and
K is a proportionality constant depending upon the physical parameters of the system.

When the inverter 11 is functioning under the six-step mode of synthesis operation above base speed 214, as shown in FIG. 8, and when full available DC line voltage is imposed on the motor, then $V_M$ reaches a peak value $V_{Mmax}$ as shown by curve 216 in FIG. 9. For a given slip S, the torque equation can then be written $$T = K \times V_{Mmax}^2 \times S \times 1/F^2, \quad (3)$$

where the first three terms are substantially constants, such that the relationship then becomes $$T_A = K^1/F^2, \quad (4)$$

with the available torque $T_A$ at a given slip frequency being an inverse function of the square of the inverter frequency.

To achieve torques higher than $T_A$ in accordance with the above relationship of equation (4) and at higher than base speed frequency, it is necessary to increase the motor voltage applied to the motor. Since the inverter 11 driving the motor 12 is connected to the available DC power source 10, without further equipment such as a front-end chopper between the DC rail and the inverter, this increased voltage cannot be supplied by the inverter 11. The addition of a front-end chopper is not desirable since it has to be able to handle full power above base speed and has to operate as a step-up and step-down chopper for a practical system.

The brake apparatus shown in FIG. 9 is operative to increase the motor voltage through the provision for each motor phase of a separate transformer 220, connected between the motor 12 and the inverter 11 and through the modulation operation in each of the phases 1, 2 and 3, this transformer using a GTO switch 222 to provide an additional voltage impressed upon the motor 12 for increasing the available torque. For illustration, the transformer 220 for phase 3 of the motor 12 is shown schematically in FIG. 9 with back-to-back thyristor switches 224 and 226 provided to short circuit the transformer 220 during power operation or during moderate brake operation where less torque is required than the torque $T_A$ in accordance with the above relationship of equation (4) and which can be provided by the inverter 11 alone. The rectifier bridge 228 is for conversion of the generated AC current from the motor 12 to the form required by the DC power source 10. The GTO switch 222 is used to modulate the duty cycle of the transformer supplied voltage inserted into the motor circuit and the diode 230 in series with the power source 10 is provided to prevent the gate turn-off thyristor switch 222 from short-circuiting the power source 10.

As can be seen in FIG. 9, the braking apparatus 80 is wired in series with the inverter 11, with the output voltage developed by the inverter 11 at points 4, 5, and 6, being provided across secondary transformer windings 234, 235, and 236, to alter the actual motor input voltage at respective phases 3, 2 and 1. The objective is to control this transformer voltage so that the voltages developed across the windings 236, 235, and 234 are directly in phase with the inverter output voltages 4, 5, and 6, respectively so as to result in higher motor input voltages for motor phases 1, 2, and 3, than those generated by the inverter 11 at points 4, 5, and 6.

Looking at the braking circuit for motor phase 1, when the thyristors 224 and 226 are continuously gated, the transformer winding 234 is shorted out and when they are not continuously gated, the thyristors will eventually turn off because of the applied AC waveforms. When the thyristors 224 and 226 are not shorting out the transformer 220, there is motor current flowing through the transformer secondary winding 234. For purpose of illustration, assume this motor current is in the direction shown by the arrow 280 in FIG. 9. This will induce current to flow in the primary winding 232 in the direction of arrow 282. In order for current to flow in the direction of arrow 282 in the winding 232, the current has to go through the diodes 284 and 286, and once the current gets through diode 284, the current has to go through diode 230. The anode of diode 230 has to be at a higher voltage than the voltage on the cathode of diode 230, and this cathode is at 600 volts because it is connected to the power source line 288. With a diode voltage drop of about 1 volt, the anode of diode 230 is going to at 601 volts. The anode of diode 284 must be at 602 volts and therefore, the end of the transformer winding 232 connected to the anode of diode 284 would be at 602 volts. The other end of the transformer winding 232 is connected to the cathode of diode 286, which is connected to the ground conductor 290 through the conducting diode 286. This provides about 600 volts across the primary winding 232 of the transformer 220. If there is 600 volts across the primary 232, that means there is about 550 volts across the secondary 234 because the transfer ratio is about 0.9. This 550 volts across the transformer winding 234 is provided when the GTO 222 in the braking circuit is off. The polarity of this 550 volts is such that the instantaneous voltage at point 3 is 550 volts less than the instantaneous voltage at point 6. When the current direction reverses, the current flow in primary 232 reverses direction and the other two diodes in bridge 228 become conducting. In this case, the polarity of the 550 volts developed across the transformer secondary winding 234 is reversed such that the instantaneous voltage at point 3 is 550 volts more than the instantaneous voltage at point 6.

Figure 11:
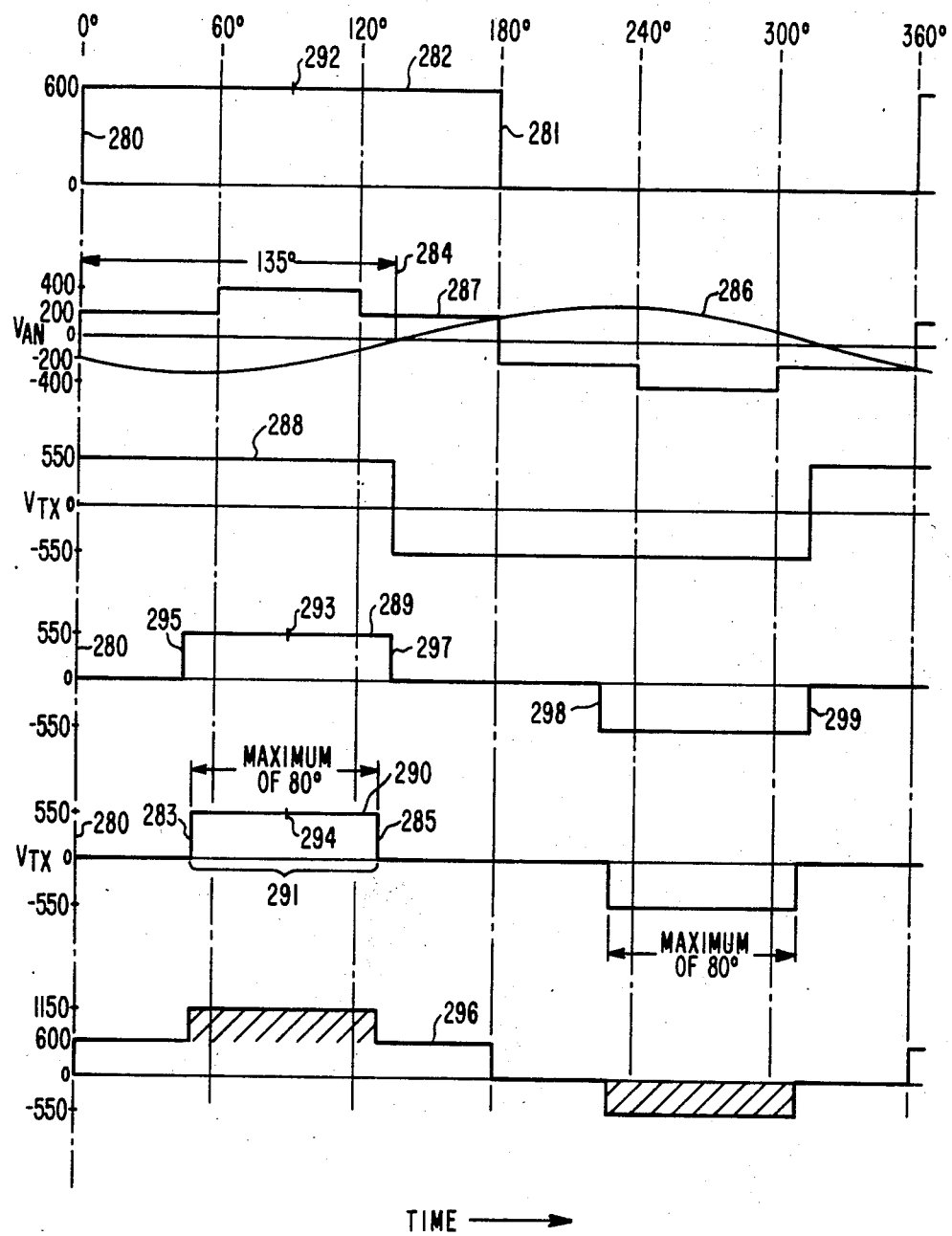
FIG. 11 shows the output voltage relationships of the inverter and braking apparatus of the present invention.

The inverter 11 output voltage at point 6 is shown as waveform 282 in FIG. 11. This is a well known inverter output voltage waveform for six-step synthesis. From the 0 mark 280 of waveform 282 to the 180 mark 281, output 6 is at 600 volts, assuming a power source of 600 volts. From the 180 mark 281 to the rest of the 360 cycle, point 6 is at 0 volts. Waveform 287 of FIG. 11 represents the actual line to neutral voltage seen by the AC motor 12 assuming that the braking apparatus 80 is not in use. As can be seen, this line-to-neutral motor voltage waveform 287 is directly in phase with the voltage waveform 282 at output 6 of the inverter 11 shown in FIG. 9. Also, since the braking apparatus is not in use, the voltage at outputs 6 and 3 are identical. If the AC motor 12 is braking, the current waveform 286 will lag the voltage waveforms 282 and 287 by about 135 degrees so from the zero crossing 280 of the voltage waveform 282 to the zero crossing 284 of the current 286 there is a lag of 135 degrees. If the braking apparatus 80 is in use, a voltage across transformer secondary winding 234 will develop depending upon the current flow through winding 234. The voltage across winding 234, which is the voltage at phase 3 minus the voltage at output 6, will look like the voltage waveform 288 provided that the thyristors 224 and 226 are not turned on and the GTO 222 is off. As shown in FIG. 11, the transformer secondary voltage 288 is out of phase with the output voltage 282, and therefore, when added together, the output voltage 282 plus the transformer secondary voltage 288 will result in a voltage at phase 3 that is phase shifted from the voltage 282. This phase shift will result in the motor current being phase shifted from that shown in 286. This current phase shift will result in the transformer secondary voltage 288 being phase shifted even more, and so on. After all phase shifts have been accounted for, the resultant motor voltage at phase 3 would be only slightly higher than the inverter output voltage 282 which is not desirable. The GTO 222 allows the transformer secondary voltage to be controlled. If the GTO 222 is turned on, the voltage across the transformer primary 232 reduces to about zero volts which reduces the voltage across the transformer secondary 234 to zero also. By controlling GTO 222, the transformer secondary voltage can be controlled so that it is always in phase with the inverter output voltage 282. The maximum possible transformer secondary voltage that can be obtained and that is in phase with the inverter output voltage 282 is shown by waveform 289. Transition 297 occurs at the zero current crossing 284. The midpoint 293 of the transformer voltage waveform 289 is halfway between transitions 295 and 297. The midpoint 292 of the inverter output voltage waveform 282 is halfway between transitions 280 and 281. If midpoints 292 and 293 occur at the same time then the transformer secondary voltage 289 is in phase with the inverter output voltage 282. When these two voltages are in phase, they will directly add to produce a higher motor input voltage at phase 3. Also, since the two voltages are in phase, the motor current 286 is not additionally phase shifted. Transition 295 is caused by turning off GTO 222, transition 297 is caused by turning on GTO 222, transition 298 is caused by turning off GTO 222, and transition 299 is caused by turning on GTO 222. Since the actual motor current 286 is not a clean sine wave, and since the zero motor crossing 284 may not be exactly 135 shifted, for practical purposes, the secondary transformer voltage is limited to the waveform 290, where the time that the GTO 222 is off is limited to the angle duration from 283 to 285 which represents a maximum of 80 degrees of the 360 degree cycle. Midpoint 294 is halfway between transitions 283 and 285 and occurs at the same time as midpoint 292 of the inverter output voltage 282. When the transformer voltage 290 is generated along with the inverter output voltage 282, the resulting input motor voltage at phase 3 is represented by waveform 296. The shaded portions of 296 represent the voltage gained by using the braking apparatus 80.

Figure 12:
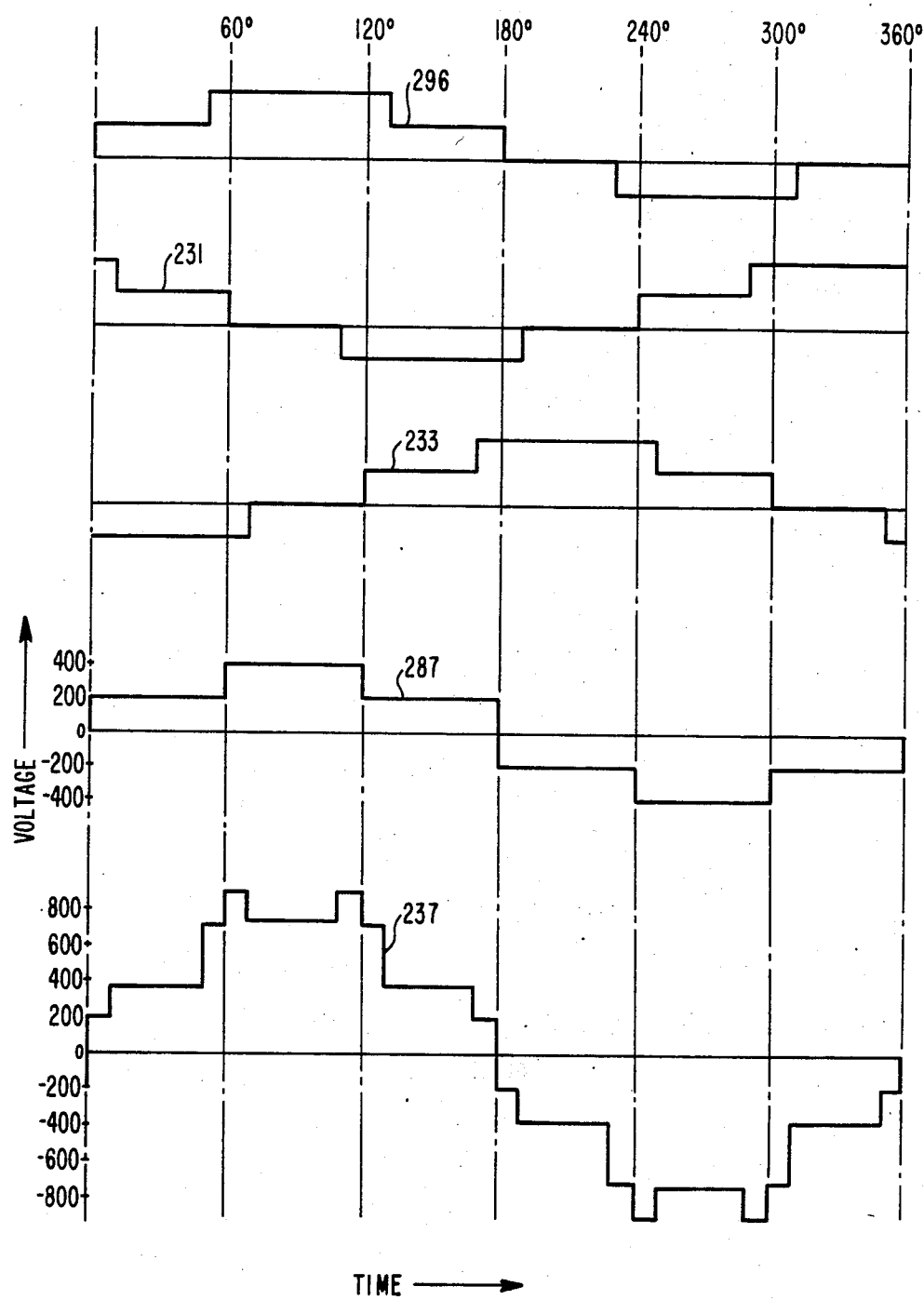
FIG. 12 shows the input motor voltage relationships.
Figure 13:
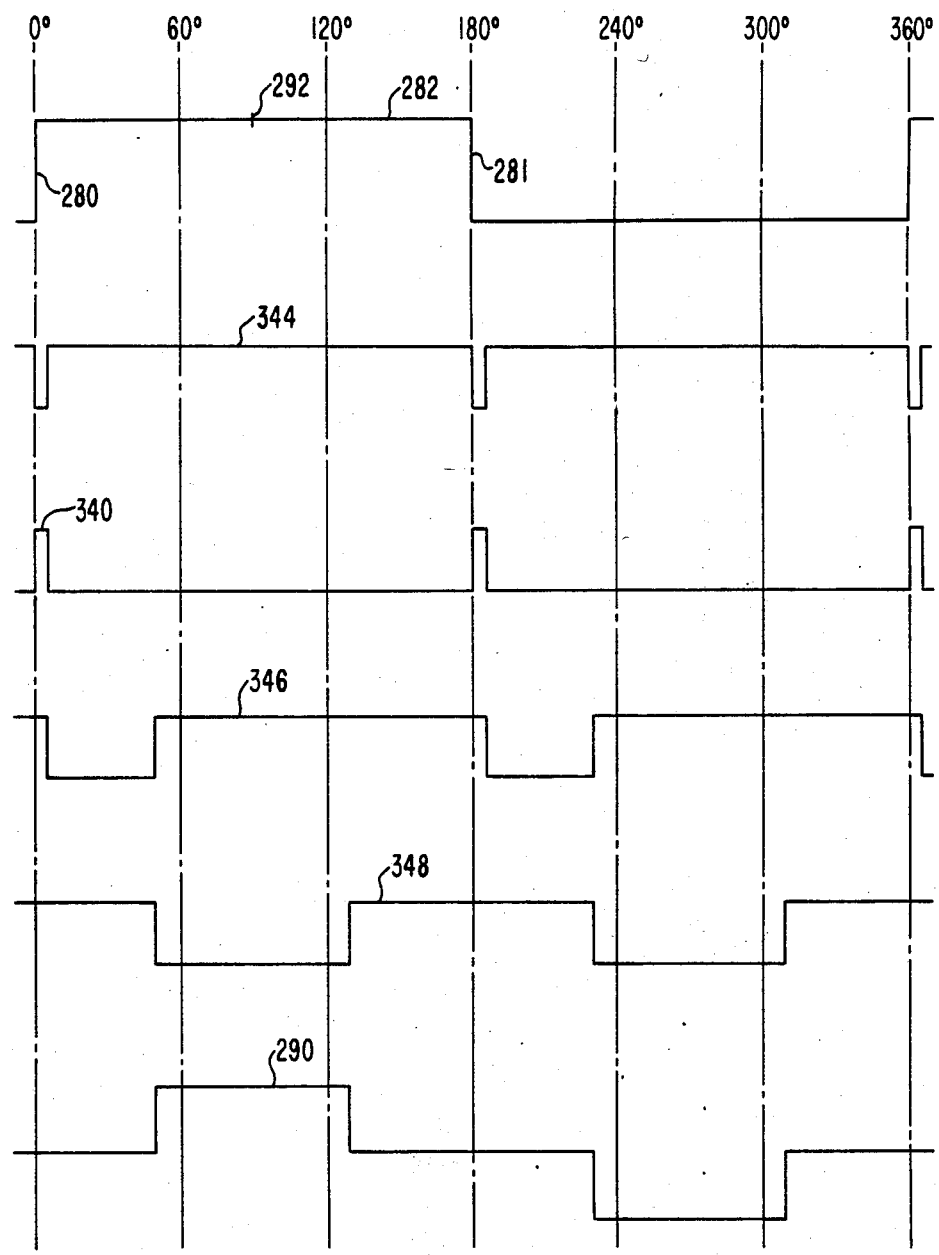
FIG. 13 shows the signal voltage relationships within the brake operation control circuit shown in FIG. 10.

The input motor voltage waveforms for motor phases 1 and 2 are calculated and represented by waveforms 231 and 233 shown in FIG. 12. The voltage 237 is the line-to-neutral motor voltage with the braking apparatus 80 producing the maximum transformer secondary voltage 290 as shown in FIG. 13. The amount of this voltage 237 that could be supplied by the inverter 11 alone is shown by waveform 287.

If a line-to-neutral motor voltage 237 less than that shown in FIG. 12 is desired, the time duration that the GTO 222 is kept off which is determined as the time from the transition 283 to the transition 285, as shown in FIG. 12, is decreased without moving midpoint 294.

Figure 10:
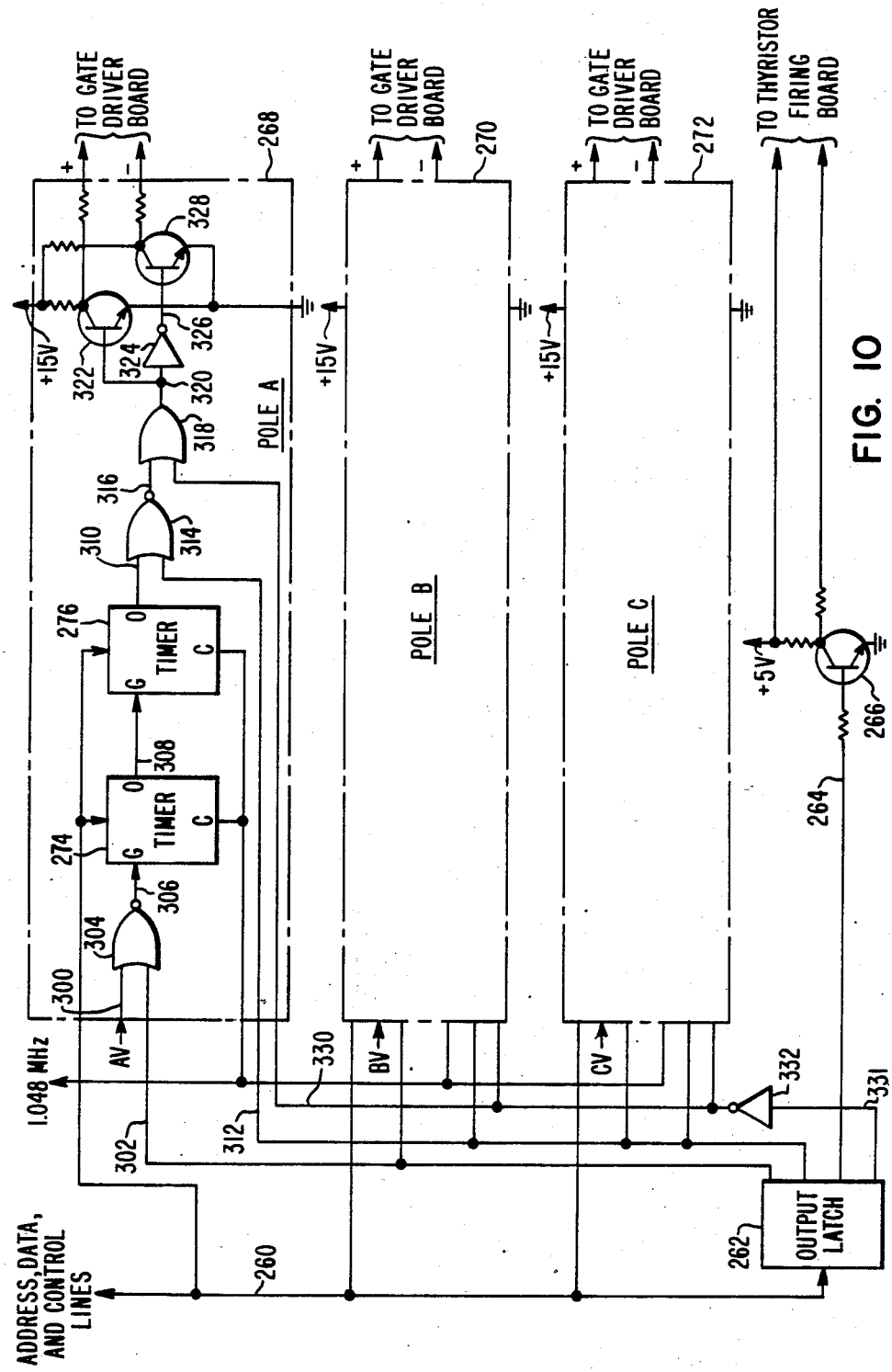
FIG. 10 shows the provided brake operation control circuit.

In FIG. 10 there is schematically shown the brake operation control circuit. The braking apparatus circuitry 268 for one motor phase is shown in greater detail. The address data and control lines 260 are coupled with the Motorola 68000 microprocessor in the inverter and braking synthesis apparatus 76, including an output port 262, which is a well known 74LS373 chip having 8 bits of output of which four of the lines are used. A first line 264 determines the conduction of a transistor 266 that controls the thyristor firing board which controls the thyristors 224 and 226 to either short out or not short out the transformer secondary winding 234 shown in FIG. 9. There are two similar thyristors for each of the other two motor phases. The thyristor firing board is well known in this art and either continuously sends gating pulses to these thyristors or does not send gating pulses to the thyristors. If the output 264 has a one value, the firing board generates continuous gating pulses and if the output 264 has a zero value the thyristors will not be supplied the continuous firing pulses. There are three GTO gate control circuits 268, 270 and 272 for the respective motor phases. In gate control circuit 268 there are two timers 274 and 276, which are well known 8254 timers. A third portion of each timer is used for each control circuit 268, 270 and 272. The timer 274 is a delay timer and timer 276 is the duration timer. A GTO switch such as 222 shown in FIG. 9 is controlled in each motor pole transformer bracking circuit.

Using Fourier analysis and knowing the braking circuit duty cycle, the line voltage and the inverter voltage position, the desired voltage across the motor can be determined and from that it can also be determined how long the duration of the brake circuit pulse 291 as should be shown in FIG. 11. The motor controller 62 determines the desired motor voltage and the voltage 282 available out of the inverter 11 in relation to the known line voltage. The amount of voltage 290 to be provided by the transformer brake apparatus 80 depends upon the duty cycle of this waveform 290 so there is a mathematical representation between the latter duty cycle and how much voltage 290 the transformer brake apparatus 80 produces. Adding the brake apparatus voltage 290 to the inverter voltage 282 establishes the desired voltage, up to the maximum at a brake angle of 80 which can be provided to satisfy the brake request.

An intermediate output of the controller 62 is total motor voltage that is desired. By determining how much the inverter 11 is supplying, the voltage difference is requested from the transformer brake apparatus 80 making sure not to go beyond the zero crossing 284 where the current 286 goes to zero. This voltage difference to be provided by the transformer brake apparatus 80 determines the calculation of the brake angle of GTO. The brake angle is less than 80 and determines the off time of the GTO 222. The synthesis operation as disclosed in above cross referenced patent application Ser. No. 696,814 knows the start 280 and the end 281 of the inverter voltage 282. Then a calculation is made of the time between the start 280 of the inverter voltage 282 and the time 283 when the GTO is to be turned off and then from the time 283 up to the time 285 when the GTO is turned on. It is desired that the inverter voltage 282 be directly in phase with the brake apparatus voltage 290 and that occurs whenever the centers 292 and 294 of the voltage waveforms 282 and 290 line up and are in phase. The synthesis operation determines the time 280 and the time 281.

The braking control circuit shown in FIG. 10 includes the timer 274 which is a delay timer to provide the delay between the time 280 and the time 283 when the GTO is turned off, which time is calculated and output to this timer 274. When the signal 300 goes high for about 1 microsecond, providing that the disable 302 is low, the NOR 304 will produce a low, 1 microsecond pulse going into the gate 306 of the timer 274. The rising edge of this low 1 microsecond pulse will gate this timer 274 which will begin counting. The output 308 will go low for a certain period of time equal to the time that is desired between the synthesis six-step transition time 280 and the GTO going off time 283. Once the low output 308 transitions to high, thus signifying the end of the delay time, timer 276 will begin counting. Output 310 will go low when timer 276 begins counting and will stay low for a period of time equal to the desired duration for GTO 222 to be off. The actual duration is less than or equal to the time equivalent of 80.

When the other input 312 is low, the NOR 314 has two low inputs so it provides a high output 316 to OR gate 318. When the line 330 is low, the OR 318 passes through the high signal 320 to the upper transistor 322 which will turn on. The NOT 324 inverts the high signal 320 into a low signal 326 to turn off the lower transistor 328. When the transistor 322 is on and the transistor 328 is off, the current direction is the reverse of what is required to fire the GTO 222, so the GTO 222 will not be fired and will turn off. Once the signal 310 goes high the transistor 322 wil be off and the transistor 328 will turn on to provide current flowing in the direction to fire the GTO 222. When the input 312 to NOR chip 314 is zero, it permits the timer 276 to turn off the GTO. If the input 312 is one, this forces the GTO 222 be always on. The input 312 is not an enable, but rather it is a disable signal to disable the timers and turn the GTO on. The input 330 to OR gate 318 goes through the NOT inverter 332. When the signal 330 is zero on the input of OR gate 318, this wil allow the timers to be in control, whereas a one on the input of OR 318 will force the GTO off, since the upper transistor 322 is always on and the lower transistor 328 is off. When the signal 302 shown in FIG. 10 is zero, the brake control circuit can operate to turn off the GTOs in the transformer braking apparatus 80, provided line 331 is one and line 312 is a zero.

In FIG. 13 there is shown a plot of the signal relationships of the brake control circuit shown in FIG. 10. The curve 340 shows the control signal 300 applied to one input of the NOR 304. This waveform 340 corresponding to control signal 300 is a normally low signal which has a one microsecond duration high pulse every time the inverter output voltage 282 transitions such as shown by transitions 280 and 281 in FIG. 11. Control signal 300 is actually generated by the inverter synthesis control circuit described in the above cross-referenced patent application Ser. No. 696,814. The waveform 344 shown in FIG. 13 is the output 306 of NOR 304. The waveform 346 is the output 308 of the delay timer 274, and waveform 348 is the output 310 of the timer 276. The GTO is on when waveform 348 is high, and the GTO is off when the waveform 348 is low, resulting in the transformer secondary voltage 290.

Figure 14:
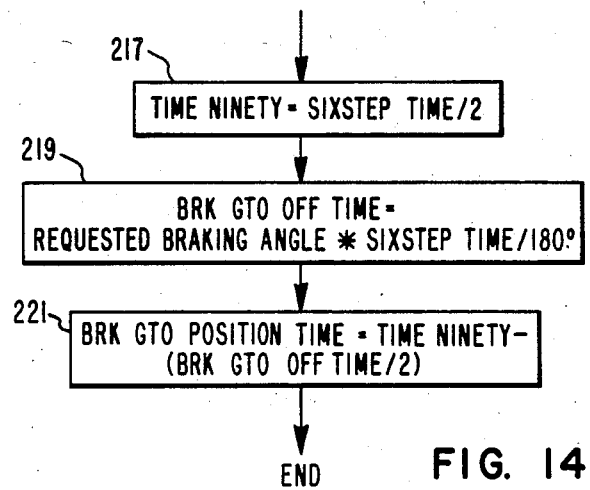
FIG. 14 shows a program flow chart to provide the control signals for the brake operation control circuit shown in FIG. 10.

The calculations needed to calculate the times needed by delay timer 274 to produce the waveform 346 and by duration timer 276 to produce the waveform 348 are shown in the flowchart of FIG. 14.

In FIG. 14, at block 217, the value time ninety is calculated which represents the time from transition 280 to the midpoint 292 of inverter voltage output waveform 282. The variable six-step time represents the time from transition 280 to 281 in waveform 282. At block 219, the brake GTO off time which is the time output to the duration timer 276 and is the time that the GTO 222 is desired to be off is calculated by multiplying the requested braking angle 70 by the six-step time and dividing by 180. In other words, the brake GTO off time is the time equivalent of the requested braking angle. In block 221, the brake GTO position time, which is the time output to the delay timer 274, is calculated by dividing the brake GTO off time by 2 and subtracting the result from time ninety.

We claim:
1. In brake control apparatus for an induction motor energized with a first voltage having a known phase relationship and provided by an inverter coupled with a power source, said control apparatus being responsive to a brake request signal, the combination of a first winding connected between the motor and the inverter, a second winding coupled with the first winding and connected with the power source for providing a second voltage for additionally energizing the motor, and stabilizing switch means connected with the second winding and responsive to the brake request signal and the first voltage for controlling the time occurrence of the second voltage to centrally coincide with said known phase relationship of the first voltage in response to the brake request signal being provided so that the total braking torque energization of the motor is increased for an operating motor speed range by stably superimposing the first and second voltage energization of the motor.

2. The brake control apparatus of claim 1, wherein said stabilizing switch means is a gate-turn-off (GTO) thyristor with the time duration of the second voltage being determined by the conductivity of the gate-turn-off (GTO) thyristor in response to the brake request signal.

3. The brake control apparatus of claim 1, with the second voltage being added to the first voltage through the coupled first and second windings for increasing the voltage energization of the motor.

4. The brake control apparatus of claim 1, with the brake request signal establishing a desired brake torque for the motor, and with the brake request signal determining the magnitude of the second voltage by controlling the conductivity of the switch means in accordance with the desired brake torque.

5. The brake control apparatus of claim 1, with the second voltage having a maximum time duration that is less than the time duration of the first voltage energization of the motor.

6. The brake control apparatus of claim 1 for a motor having a base speed
with the second winding providing the second voltage when the motor is operating above said base speed.

7. The brake control apparatus of claim 1 for a motor having a base speed and with the slip of the motor above base speed being controlled by the inverter frequency to provide a maximum voltage output,
with the second winding being operative above base speed to provide the second voltage for a time period less than the first voltage determined by the brake request signal.

8. The method of control for an electric motor coupled with a power source and in response to a brake request signal, including the steps of
energizing the motor with a first voltage signal provided by an inverter coupled with the power source,
energizing the motor with a second voltage signal provided by a brake supplemental circuit coupled with the power source and connected in series with the inverter,
providing a first time duration of the first voltage signal in response to the brake request signal,
providing a second time duration of the second voltage signal less than the first time duration and in response to the brake request signal, and
controlling the second voltage signal to be in a centrally coincident phase relationship with and additive to the first voltage signal for the energization of the motor so that the resulting output braking torque increase for the motor is stabilized for operation.

9. The method of motor control of claim 8, including the step of
controlling the second time duration of the second voltage signal in response to the brake request signal for energizing the motor in addition to said first voltage to determine a desired output torque in accordance with the brake request signal.

10. The motor control method of claim 8, with the second voltage signal being added to the first voltage signal for increasing the energization of the motor in relation to the motor energization by the first voltage signal.

11. The motor control method of claim 8, with the motor having a base speed and the brake request signal establishing a desired output torque for the motor, and with the second voltage signal being added to the first voltage signal to provide increased output torque by the motor when operating above said base speed.

12. The motor control method of claim 8, with the first voltage signal providing an alternating current energization of the motor that has a zero voltage crossover, and with the second time duration of the second voltage signal being limited by said zero voltage crossover.

13. The method of motor control of claim 8 for a motor having a base speed,
with the first voltage signal above said base speed being a predetermined voltage output of the inverter, and
with the second time duration of the second voltage signal being less than a predetermined maximum time duration determined by the first voltage signal.

14. The method of motor control of claim 8 for an induction motor having a slip and a base speed, including the step of
controlling the slip of the motor above base speed to be held at substantially rated slip,
with the first voltage signal above base speed being the maximum output voltage of the inverter, and
with the second voltage signal being determined above base speed in response to said brake request signal and added to the first voltage signal to determine the output torque of the motor.

15. The method of motor control of claim 14,
with the second voltage signal reaching a predetermined maximum value established by the first voltage signal and being held at that maximum value, and
increasing the slip above said rated slip in response to said effort request signal upon the second voltage signal reaching said maximum value.

16. An improved method of control for an electric motor in a transit car coupled with a power source and in response to a brake request signal, including the steps of
energizing the motor with a first voltage signal provided by an inverter coupled with the power source,
energizing the motor with a second voltage signal provided by a brake supplemental circuit coupled with the power source and connected in series with the inverter,
providing a first time duration of the first voltage signal in response to the brake request signal,
providing a second time duration of the second voltage signal less than the first time duration and in response to the brake request signal,
controlling the second voltage signal to be in a centrally coincident phase relationship with and additive to the first voltage signal for the energization of the motor,
controlling the slip of the motor above base speed to be held at substantially rated slip, with the first voltage signal above base speed being the maximum output voltage of the inverter, and
with the second voltage signal being determined above base speed in response to said brake request signal and added to the first voltage signal to determine the improved output braking torque of the motor which is stabilized for a wide range of operating car speeds.

* * * * *